(12) United States Patent
Ishikawa et al.

(10) Patent No.: US 8,743,267 B2
(45) Date of Patent: Jun. 3, 2014

(54) OPTICAL APPARATUS FOR CALCULATING AN OBJECT DISTANCE

(71) Applicant: Canon Kabushiki Kaisha, Tokyo (JP)

(72) Inventors: Masanori Ishikawa, Saitama (JP); Seiichi Kashiwaba, Utsunomiya (JP); Atsushi Koyama, Utsunomiya (JP); Masayasu Mizushima, Utsunomiya-shi (JP); Hirokazu Shukuin, Shioya-gun (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/661,276

(22) Filed: Oct. 26, 2012

(65) Prior Publication Data
US 2013/0107105 A1    May 2, 2013

(30) Foreign Application Priority Data
Oct. 28, 2011    (JP) ................. 2011-236922

(51) Int. Cl.
*H04N 5/225*    (2006.01)
*G03B 13/00*    (2006.01)
*G02B 27/10*    (2006.01)

(52) U.S. Cl.
USPC ............ 348/345; 348/353; 348/207.99

(58) Field of Classification Search
USPC ................... 348/207.99, 345, 353
See application file for complete search history.

(56) References Cited

U.S. PATENT DOCUMENTS

2006/0238903 A1* 10/2006 Sato et al. ............... 359/824
2007/0223912 A1*  9/2007 Sugimoto ................ 396/439

FOREIGN PATENT DOCUMENTS

| JP | 09-197259 A | 7/1997 |
| JP | 2006-227414 A | 8/2006 |
| JP | 2011-123339 A | 6/2011 |

* cited by examiner

*Primary Examiner* — Joel Fosselman
(74) *Attorney, Agent, or Firm* — Rossi, Kimms & McDowell, LLP (57) ABSTRACT

An optical apparatus includes a first driver configured to drive a focus lens unit in autofocusing, a second driver configured to drive the focus lens unit in the autofocusing, a first detector configured to detect a driving amount of the first driver, a second detector configured to detect a driving amount of the second driver, a memory configured to store a relationship between information of detection results of the first and second detectors, and an object distance as a distance from the optical apparatus to an object, and a controller configured to obtain information of the object distance based upon the relationship stored in the memory and the detection results of the first and second detectors.

10 Claims, 5 Drawing Sheets

OPTICAL APPARATUS FOR CALCULATING AN OBJECT DISTANCE

BACKGROUND OF THE INVENTION

1. Field of the Invention

The present invention relates to an optical apparatus configured to calculate an object distance.

2. Description of the Related Art

Japanese Patent Laid-Open Nos. ("JPs") 2011-123339 and 2006-227414 disclose two focus lenses, two drivers each configured to drive a corresponding one of the focus lenses, and a controller configured to control the two drivers. JP 09-197259 discloses a camera that includes a wobbling lens separate from a focus lens in a mountain-climbing autofocus ("AF"), and holds the wobbling lens at the midpoint in the manual focusing.

JPs 2011-123339 and 2006-227414 provide a first driver with a lead screw having a large lead angle for fast driving from the infinity to the close end, and a second driver with a lead screw having a small lead angle for precise driving of a micro driving amount. As a result, the fast and precise AF can also be realized with two types of focus lenses. A fast and precise AF can be realized with two drivers for one focus lens. In this case, the second driver drives the focus lens, and the first driver drives the focus lens and a barrel configured to hold the second driver. The lead angle of the lead screw of each driver is similar to the above one.

The prior art that includes a single focus lens and a single driver optimizes the AF and auto-exposure ("AE") by calculating an object distance from a detection result of a detector configured to detect the position of the focus lens. However, no calculating method of the object distance has been proposed when two drivers drive the focus lens unit.

SUMMARY OF THE INVENTION

The present invention provides an optical apparatus that includes two drivers configured to drive a focus lens unit, and can precisely calculate an object distance.

An optical apparatus according to the present invention includes a first driver configured to drive a focus lens unit in autofocusing, a second driver configured to drive the focus lens unit in the autofocusing, a first detector configured to detect a driving amount of the first driver, a second detector configured to detect a driving amount of the second driver, a memory configured to store a relationship between information of detection results of the first and second detectors, and an object distance as a distance from the optical apparatus to an object, and a controller configured to obtain information of the object distance based upon the relationship stored in the memory and the detection results of the first and second detectors.

Further features of the present invention will become apparent from the following description of exemplary embodiments with reference to the attached drawings.

DESCRIPTION OF THE EMBODIMENTS

A description will be given of embodiments of the present invention with reference to the accompanying drawings.

First Embodiment

Figure 1:
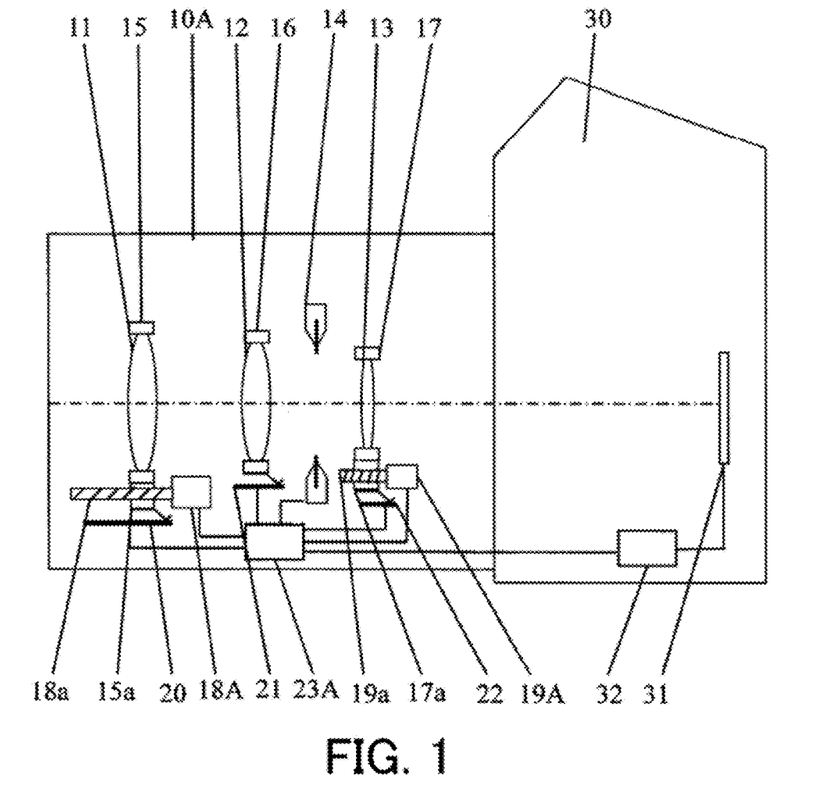
FIG. 1 is a schematic block diagram of a camera system according to a first embodiment of the present invention.

FIG. 1 is a schematic block diagram of a camera system according to a first embodiment. The camera system according to the first embodiment includes an exchange lens (lens barrel) 10A, and a camera body 30 to which the exchange lens 10A is attachable. The optical apparatus of the present invention includes a camera body (image-pickup apparatus) to which the exchange lens is attachable, a camera system that includes a camera body to which the exchange lens is attachable and the exchange lens, a lens integrated camera, and a lens barrel. The camera body 30 may be a digital still camera, a digital video camera, or the like.

This embodiment is applied to a mirror-less lens-exchange-type camera having no mirror box. The mirror box includes a main mirror and a sub-mirror configured to lead light from an object to a viewfinder and a focus detector and usually provided to a conventional single-reflex camera. Nevertheless, the present invention is applicable to an optical apparatus including the mirror box.

The exchange lens 10A houses an image-pickup optical system configured to form an optical image of an object. The image pickup optical system includes, from an object side along an optical path, a first lens unit 11 as a first focus lens unit, a second lens unit 12 as a variator lens unit or a zoom system, a third lens unit 13 as a second focus lens unit, and a diaphragm 14. The diaphragm 14 is provided between the second lens unit 12 and the third lens unit 13, and used to adjust the light quantity.

Reference numeral 15 denotes a first unit barrel configured to hold the first lens unit 11, and includes a rack unit 15a engaged with a lead screw 18a of a first stepping motor 18A, and linearly guided by a linear movement bar (not illustrated). As a result, as the first stepping motor 18A is driven, the second lens unit 11 is linearly moved in the optical axis direction and provides focusing.

Reference numeral 16 denotes a second unit barrel configured to hold the second lens unit 12, and linearly driven in the optical axis direction by an external manipulator (not illustrated) in zooming.

Reference numeral 17 denotes a third unit barrel that is configured to hold the third lens unit 13, includes a rack unit 17a engaged with a lead screw 19a of the stepping motor 19A and linearly driven in a linear movement bar (not illustrated). As a result, as the second stepping motor 19A is driven, the third lens unit 13 is linearly driven in the optical axis direction and provides wobbling and focusing.

The first stepping motor 18A is a first driver configured to drive the first unit barrel 15, and includes the lead screw 18a as an output shaft. The first stepping motor 18A can provide faster driving than the second stepping motor 19A. The lead of the lead screw 18a is larger than that of the lead screw 19a and thus has a wider driving range. Thereby, a driving amount per one pulse by the first stepping motor 18A is larger, and the first lens unit 11 can be driven from the infinity to the close end at a (first) speed higher than a (second) speed of the third lens unit 13.

The second stepping motor 19A is a second driver configured to drive the third unit barrel 13, and includes the lead screw 19a as an output shaft. The lead of the lead screw 19a is smaller than that of the lead screw 18a, and thus a narrower driving range. Thereby, a driving amount per one pulse by the second stepping motor 19A is smaller, and the third lens unit 13 can be driven with a second resolution higher than a first resolution of the first stepping motor 18A (or with higher positioning precision).

Thus, this embodiment provides an actuator that can provide fast and precise driving by utilizing the two stepping motors having different characteristics and the two lead screws having different leads. The two drivers having the different characteristics are not always necessary if these two drivers are used to precisely calculate the object distance.

A type of the actuator is not limited, and an ultrasonic motor, a voice coil motor, and another actuator may be used. For example, the first lens unit 11 may be driven at a high speed by utilizing an ultrasonic motor and a cam.

Reference numeral 20 denotes an absolute value encoder as a (first) detector configured to detect a driving amount of the first unit barrel 15 by the first stepping motor 18A. Reference numeral 21 denotes an absolute value encoder configured to detect a driving amount of the second unit barrel 16. Reference numeral 22 denotes an absolute value encoder as a (second) detector configured to detect a driving amount of the third unit barrel 17 by the second stepping motor 19A.

Each of the absolute value encoders 20, 21, and 22 includes a zone brush fixed onto each barrel, and a zone substrate having a zone pattern arranged in a fixing unit. As the barrel is driven, the zone brush moves relative to the zone substrate, a contact zone pattern is switched and an absolute position of each lens unit is detected.

Reference numeral 23A is a lens CPU as a lens controller (microcomputer) configured to communicate with a camera CPU 32 so as to send and receive information, and to control each component in the exchange lens 10A. More specifically, the lens CPU 23A receives AF information and exposure control information from the camera CPU 32, and controls driving over the stepping motors 18A and 19A and the diaphragm 14. The lens CPU 23A obtains information of the object distance as a distance from the exchange lens 10A (or camera system) to the object based upon the output results of the encoders 20 and 22, and outputs it with information of the focal length detected by the encoder 21 to the camera CPU 32.

The camera body 30 includes an image-pickup element 31 and the camera CPU 32.

The image-pickup element 31 is a CMOS, CCD, or the like, configured to photoelectrically convert the optical image of the object formed by an image-pickup optical system. The image-pickup light flux from the object passes the image-pickup optical system of the exchange lens 10A, and forms an image on the plane of the image-pickup element 31. In the contrast AF, at least one of the first and second focus lens units is moved so that an evaluation value representative of the sharpness can have a peak, which is obtained from a signal that results from the output of the image-pickup element 31, is A/D-converted, and processed by a signal processor (not illustrated).

In the contrast AF, the focus lens is moved in the optical axis direction to an in-focus position corresponding to a maximum value (peak value) of an evaluation value (contrast value) of the sharpness. A method for positioning the lens to the peak position after the lens goes past the peak position is referred to as a mountain-climbing method.

When a stepping motor having a lead screw is used to drive the focus lens, the focus lens can be moved to a precise position. When the sharpness signal while the lens is being moved varies from ascent to descent, the focus lens is returned to the position that provides the maximum value of the sharpness signal.

When the sharpness changes from the in-focus state, the focus lens is again driven because it is determined that the object distance is changed, and the focus lens is again stopped at the position that provides a peak of the sharpness.

In order to detect whether the in-focus position is located on the infinity side or the close end side of the current position of the focus lens, the focus lens is wobbled to both the infinity side and the close end side by predetermined pulses, and the mountain-climbing AF is started in the direction in which the sharpness signal increases.

Since the camera body 30 is a mirror-less camera, an output corresponding to a phase difference may be generated by providing the image-pickup element 31 with a plurality of sets of pixels configured to receive light that pass part of the exit pupil of the image-pickup optical system.

The camera CPU 32 is a camera controller (microcomputer) configured to communicate with the lens CPU 23A so as to transmit and receive information, and controls the entire camera, such as recording of a video signal, AF, and exposure.

More specifically, the image-pickup magnification is calculated based upon information of an object distance and the information of the focal length input from the lens CPU 23A, and the AF focus detection range and the photometric range are selected based upon the size of the object on the image-pickup plane.

The defocus amount and direction are calculated based upon the video signal of the image-pickup element 31, and the AF driving instruction is output to the CPU 23A.

In focusing, when the AF driving instruction is issued, the camera CPU 32 makes the third lens unit 13 wobble in the optical axis direction for micro changing of a focus position at the image pickup of the image-pickup element 31. The camera CPU 32 receives the video signal from the image-pickup element 31, calculates the sharpness of the image based upon the video signal, and sends to the lens CPU 23A a focus signal which instructs it to drive the lens to the high side of the sharpness (in the in-focus direction).

In response, the lens CPU 23A drives the first stepping motor 18A and drives the first lens unit 11 at a high speed in the in-focus direction. The camera CPU 32 continues to calculate the sharpness of the image based upon the video signal of the image-pickup element 31 in that period, and drives the first lens unit 11 until the lens has crossed the peak of the sharpness. When detecting the peak, the camera CPU 32 stops driving by the first stepping motor 18A, and instead instructs fine driving (focusing) by the second stepping motor 19A up to the maximum position of the sharpness.

This embodiment drives the second stepping motor 19A after the first stepping motor 18A is driven. The first stepping motor 18A is used to move the lens to a position near the in-focus position, and the second stepping motor 19A having a finer driving resolution is used to move the lens from that position to the in-focus position. This configuration can provide a quick and precise AF.

Figure 2:
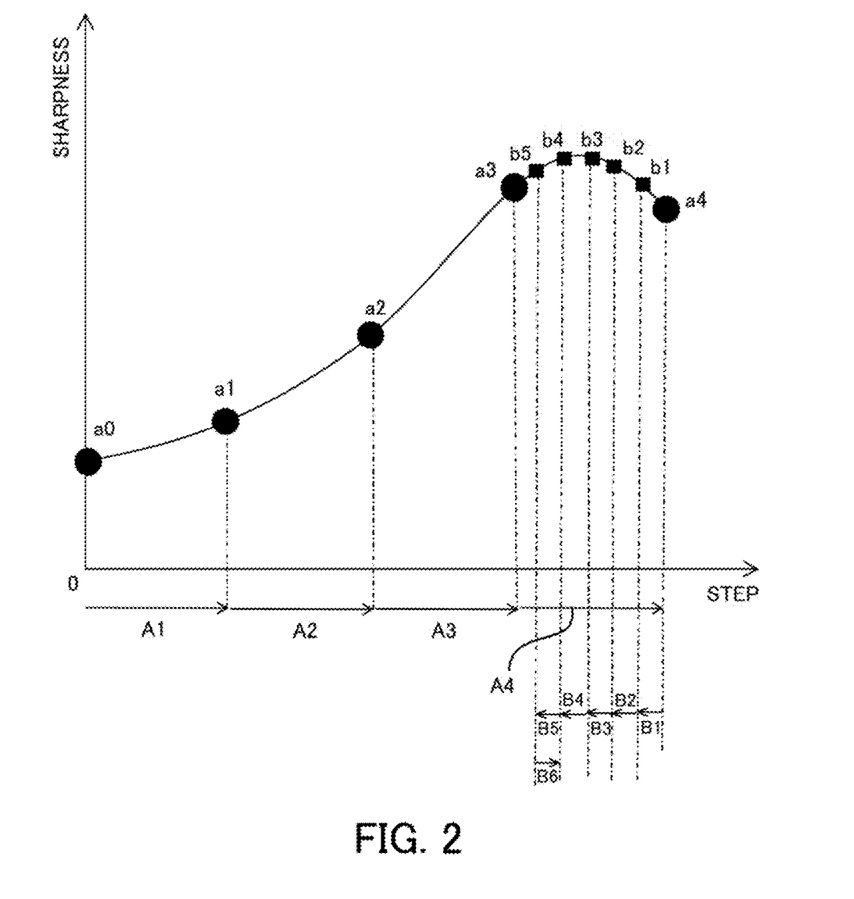
FIG. 2 is a graph of a relationship between a driving pulse in a camera system illustrated in FIG. 1 and the sharpness of an image according to the first embodiment.

FIG. 2 is a graph illustrating a change of the sharpness for each step of the first and second stepping motors 18A and 19A. The abscissa axis denotes the step of each stepping motor, and the ordinate axis denotes the sharpness. When the first stepping motor 18A is driven from the initial position 0, the first lens unit 11 is moved by large equal steps A1, A2, A3, and A4, and the sharpness a1, a2, a3, or a4 is detected for each step.

The camera CPU 32 confirms the history the sharpness. Assume that a0 is initial sharpness. Then, the sharpness increases from a0 to a3, but a4 is smaller than a3. Thus, the camera CPU 32 determines that there is a peak between a3 and a4, and it is determined that the a4 position has passed the sharpness peak. Thus, the camera PCU 32 instructs the lens CPU 23A to stop driving the first stepping motor 18A at the a4 position.

Next, driving by the second stepping motor 19A is started in the reverse direction from the position at which the step A4 ends. Then, the third lens unit 13 is driven in order of small equal steps B1, B2, B3, B4, and B5, and the sharpness b1, b2, b3, b4, or b5 is detected for each step.

The camera CPU 32 confirms the history the sharpness. The sharpness increases from a4 to b4 but a5 is smaller than b4. Thus, b4 is a peak, and it is determined that the b5 position has passed the peak of the sharpness. Thus, the camera PCU 32 instructs the lens CPU 23A to stop driving the second stepping motor 19A. Next, the camera CPU 32 instructs the second stepping motor 19A to drive back by one step (step B6) so as to focus upon the b4 position as the peak of the sharpness.

As discussed above, a feed amount of the third lens unit 13 per one step by the second stepping motor 19A is set smaller than a feed amount of the first lens unit 11 per one step by the first stepping motor 18A. However, a feed amount per one step may be set based upon an image plane variation per a driving amount of each of the first and third lens units 11 and 13, and a driving amount per one step by the second stepping motor 19A is set so as to satisfy the following two conditions: An image plane variation amount per one step is set finer than the image plane variation amount by the first stepping motor 18A; and the image plane variation amount per one step is set smaller than the permissible in-focus precision.

Next follows a description of an acquisition of information of the object distance. The detection result of the absolute value encoder 20 configured to detect the absolute position of the first lens unit 11 and the detection result of the absolute value encoder 22 configured to detect the absolute position of the third lens unit 13 are output to the lens CPU 23A. The lens CPU 23A calculates the object distance based upon the detection results of the absolute value encoders 20 and 22 and a matrix table illustrated in FIG. 3.

Figure 3:
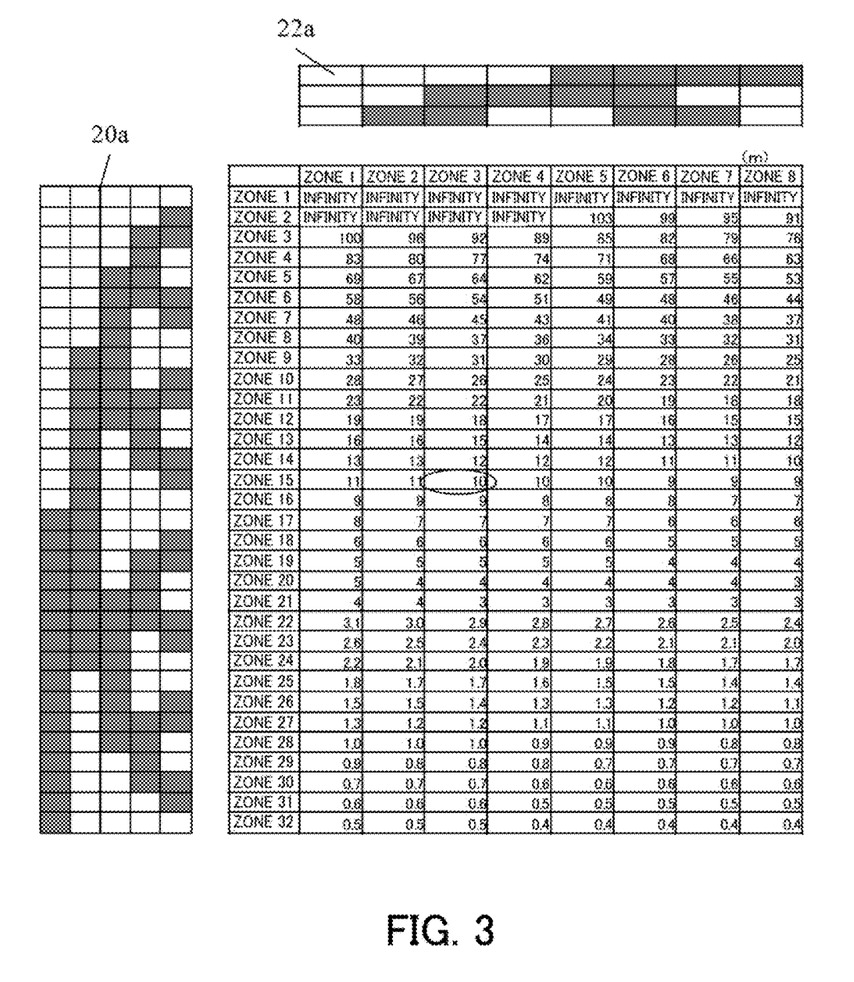
FIG. 3 is a table for explaining a determination of an object distance of the camera system illustrated in FIG. 1 according to the first embodiment.

In the row of the matrix illustrated in FIG. 3, 32-divided zone areas of information corresponding to the detection result of the absolute value encoder 20 are arranged in ascending order from zone 1, zone 2, ..., zone 32 from top to bottom. Similarly, in the column, 8-divided zone areas of information corresponding to the detection result of the absolute value encoder 22 are arranged in ascending order from zone 1, zone 2, ..., zone 8 from left to right. The object distance is assigned to the component of the matrix.

In FIG. 3, the object distance is expressed as a numerical value but the notation is not limited as long as it represents the information of the object distance. This embodiment sets the number of zone areas of the encoder 20 used for the first stepping motor 18A that has a larger stepping amount, more than that of the encoder 22, and improves the precision of the object distance.

Reference numerals 20a and 22a represent the zone patterns for the encoders 20 and 22. In the above matrix table, for example, when the zone 15 is detected by the encoder 20 and the zone 3 is detected by the encoder 22, the CPU 23A determines the object distance to be 10 m.

This embodiment arranges information of the detection results of the absolute value encoders 20 and 22 in a matrix and assigns the object distance to the matrix element. However, as long as the lens CPU 23A has previously obtained a relationship between the object distance and values detectible by the absolute value encoders 20 and 22, and the relationship is not limited to a table and a graph and an operational expression may be used. A memory inside or outside the lens CPU 23A stores this relationship, and the lens CPU 23A obtains the information of the object distance based upon the relationship and the actual detection results of the absolute value encoders 20 and 22. The lens CPU 23A previously obtains this relationship, and can precisely acquire information of the object distance.

In the lens exchange type of this embodiment, the lens CPU 23A obtains object distance information but the lens CPU 23A may send the information of the detection results of the absolute value encoders to the camera CPU 32 and the camera CPU 32 may obtain the object distance. In this case, the above memory is provided in the camera body 30. In the lens integrated type, the camera CPU obtains the object distance.

Figure 4:
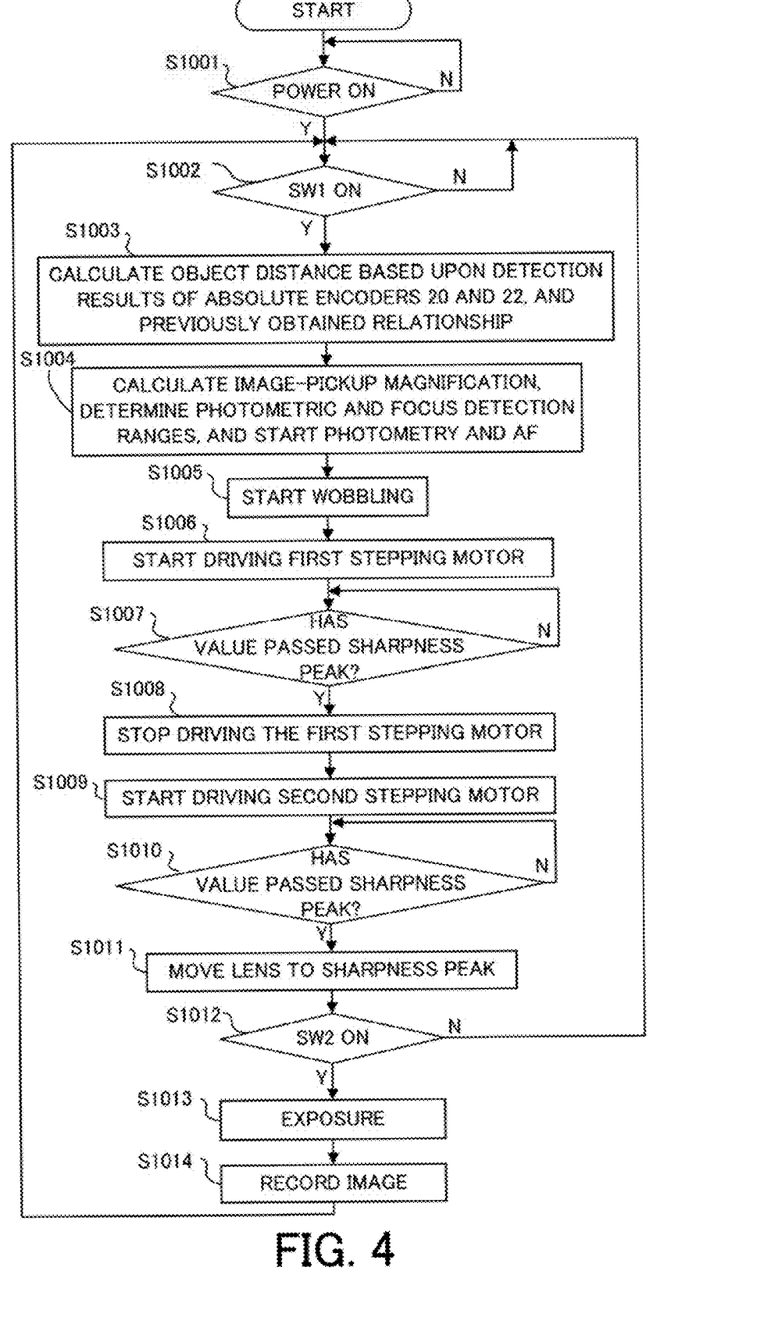
FIG. 4 is a flowchart for explaining an operation of the camera system illustrated in FIG. 1 according to the first embodiment.

FIG. 4 is a flowchart for explaining a major operation of the camera system, and "S" stands for the step. The operation illustrated in FIG. 4 can be implemented as a program executable by a computer, such as the camera CPU 32 or the lens CPU 10, and stores in a memory (not illustrated) in the lens barrel 10 or the camera body 30.

When the power SW of the camera body 30 turns on (Y of S1001), the power is supplied to the lens barrel 10 (or the camera body 30 communicates with the lens barrel 10 when a new battery is attached, when the lens barrel 10 is attached to the camera body 30, or in another case).

Next, the camera CPU 32 determines whether a SW1 signal of the release SW is generated (S1002). When it is generated, the flow moves to S1003. When it is not generated, the flow moves to S1002. In S1003, the lens CPU 23A calculates the object distance based upon the detection results of the absolute value encoders 20 and 22 and the matrix table illustrated in FIG. 3 or another previously obtained relationship, and sends that information and the focal length information to the camera CPU 32.

In S1004, based upon the object distance and the focal length, the camera CPU 32 calculates the image-pickup magnification, determines the photometric range and the focus detection range, and starts photometry and AF. The photometric range and the focus detection range are updated based upon the latest data of information of the focal length and the information of the object distance sent from the lens side.

In S1005, the camera CPU 32 instructs the lens CPU 23A to start driving of wobbling. Thereby, the lens CPU 23A drives the second stepping motor 19A, and starts detecting the in-focus direction by calculating the sharpness of the video signal in the above selected focus detection range.

In S1006, the camera CPU 32 starts focusing (mountain-climbing AF) of the first lens unit 11 through the first stepping motor 18A based upon the information of the focus direction detected by the wobbling, and calculates the sharpness of the image for each driving step. In S1007, the camera CPU 32 determines whether the sharpness of the image has passed the maximum value, and if so stops driving the first stepping motor 18A (S1008). In S1009, the camera CPU 32 starts focusing (mountain-climbing AF) of the third lens unit 13 through the second stepping motor 19A, and calculates the sharpness of the image for each driving step.

In S1010, whether the camera CPU 32 determines the sharpness of the image has passed the maximum value, and if so drives the second stepping motor 19A back to the maximum position of the sharpness (S1011). In S1012, turning on/off of the SW2 is detected, and if the SW2 is turned on, the flow moves to S1013, if the SW2 is turned off, the flow moves to S1002. In S1013, the exposure operation is started, and the shutter is opened and the image-pickup element is exposed after the diaphragm control is completed. In S1014, the output of the image-pickup element is recorded and the flow moves to S1002.

This embodiment can precisely calculate the object distance based upon the detection results of two detectors configured to detect two drivers and the relationship illustrated in FIG. 3.

Second Embodiment

Figure 5:
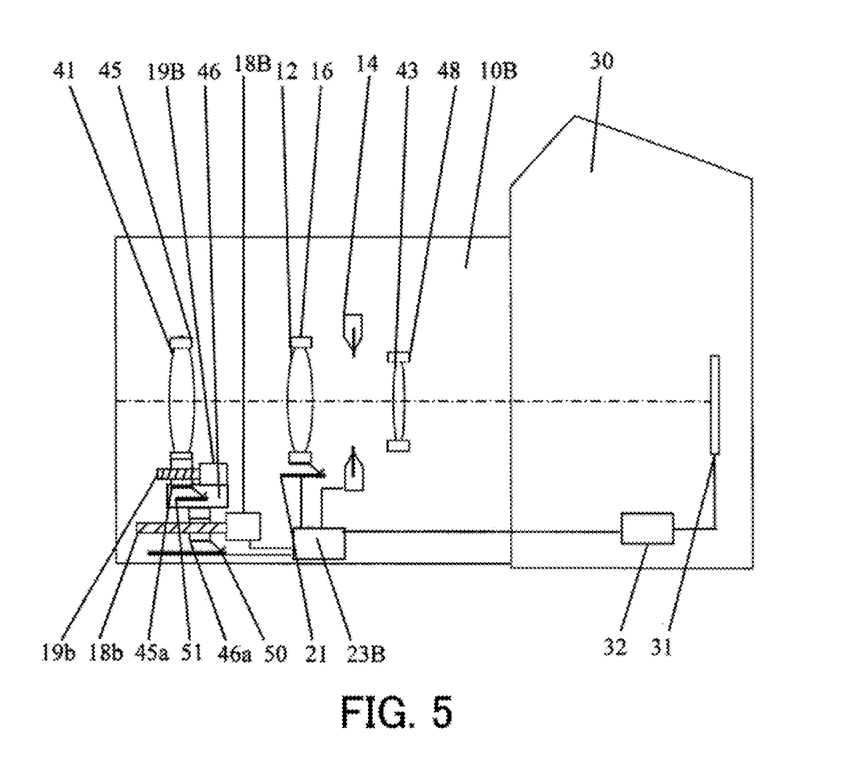
FIG. 5 is a schematic block diagram of a camera system according to a second embodiment of the present invention.

FIG. 5 is a schematic block diagram of a camera system according to a second embodiment. The camera system according to the second embodiment includes an exchange lens (lens barrel) 10B, and the camera body 30 to which the exchange lens 10B is attachable, and the exchange lens 10B is different in structure from the exchange lens 10A.

The exchange lens 10B houses an image-pickup optical system configured to form an optical image of an object. The image-pickup optical system includes, in order from the object side along the optical path, a first lens unit 41 as a focus lens that serves wobbling, a second lens unit 12 as a variator lens unit or a zoom system, a third lens unit 43 as an imaging lens or a relay system, and a diaphragm 14. The diaphragm 14 is provided between the second lens unit 12 and the third lens unit 43, and configured to adjust a light quantity.

Reference numeral 45 denotes a first unit barrel configured to hold the first lens unit 41, includes a rack unit 45a engaged with a lead screw 19b of a second stepping motor 19B, and is linearly guided by a linear bar (not illustrated). As a result, when the second stepping motor 19B is driven, the first lens unit 41 is linearly moved in the optical axis direction for wobbling and focusing.

Reference numeral 46 denotes a first unit base configured to hold the second stepping motor 19B, includes a rack unit 46a engaged with a lead screw 18b of a first stepping motor 18B, and is linearly guided by a linear bar (not illustrated). As a result, when the first stepping motor 18B is driven, the first lens unit 41 is linearly moved with the second stepping motor 19B in the optical axis direction for focusing.

Reference numeral 48 denotes a third unit barrel configured to hold the third lens unit 43, and fixed onto the lens body of the third lens unit 43.

The first stepping motor 18B is a first driver that is configured to drive the first unit base 46, and includes the lead screw 18b as an output shaft. The first stepping motor 18B can be driven at a higher speed than that of the second stepping motor 19B. The lead of the lead screw 18b is larger than the lead of the lead screw 19b, and has a wider driving range. Thereby, a driving amount per one pulse by the first stepping motor 18B is larger, and the first lens unit 41 can be driven at a higher speed (first speed) than the (second) speed by the second stepping motor 19B from the infinity to the close end.

The second stepping motor 19B is a second driver that is configured to drive the first unit barrel 45, and includes the lead screw 19b as an output shaft. The lead of the lead screw 19b is smaller than the lead of the lead screw 18b, and has a narrower driving range than that of the lead screw 18b. Thereby, a driving amount per one pulse by the second stepping motor 19B is smaller, and can drive the first lens unit 41 with a second resolution (or positioning precision) higher than the first resolution of the first stepping motor 18B.

Reference numeral 50 denotes an absolute value encoder as a (first) detector configured to detect a driving amount of the first unit base 46 by the first stepping motor 18B. Reference numeral 51 denotes an absolute value encoder as a (second) detector configured to detect a driving amount of the first unit barrel 45 by the second stepping motor 19B.

The absolute value encoder 50 includes a zone brush fixed onto the first unit base 46, and a zone substrate having a zone pattern arranged onto the fixing unit, and is configured to detect a moving amount of the first unit base 46 by the first stepping motor 18B. The absolute value encoder 51 includes a zone brush fixed onto the first unit barrel 45, and a zone substrate having a zone pattern arranged onto the first unit base 46, and is configured to detect a moving amount of the first unit barrel 45 relative to the first unit base 46 by the second stepping motor 19B. Similar to the first embodiment, when the motor is driven, the zone brush is moved relative to the zone substrate, and the zone pattern is changed.

Reference numeral 23B denotes a lens CPU that serves as a lens controller (microcomputer) configured to communicate with the camera CPU 32 so as to send and receive information, and to control each component in the exchange lens 10B. More specifically, lens CPU 23B receives the AF information and the exposure control information from the camera CPU 32, and controls driving of the stepping motors 18B and 19B and the diaphragm 14. The lens CPU 23B calculates information of the object distance based upon the output results of the encoders 50 and 51, and outputs the object distance with focal length information detected by the encoder 21 to the camera CPU 32.

In focusing, when the AF driving instruction is issued, the camera CPU 32 makes the first lens unit 41 wobble in the optical axis direction. Similar to the first embodiment, the camera CPU 32 sends to the lens CPU 23B a focus signal that instructs it to drive the lens to the sharpness peak based upon the video signal from the image-pickup element 31.

In response, the lens CPU 23B drives the first stepping motor 18B and drives the first unit base 46 at a high speed in the in-focus direction. When detecting that a value has passed the sharpness peak, the camera CPU 32 stops driving by the first stepping motor 18B, and instead instructs fine driving (focusing) by the second stepping motor 19B to the maximum position of the sharpness.

This embodiment drives the second stepping motor 19B after the first stepping motor 18B is driven. The first stepping motor 18B is used to move the lens to a position near the in-focus position, and the second stepping motor 19B having a finer driving resolution is used to move the lens from that position to the in-focus position. Thereby, a quick and precise AF can be realized.

A change of the sharpness for each step of the stepping motor of this embodiment is similar to FIG. 2. In this case, the steps A1-A4 in FIG. 2 are performed by the first stepping motor 18B, and the steps B1-B6 are performed by the second stepping motor 19B.

Next follows a description of an acquisition of information of the object distance. The detection result of the absolute value encoder 50 configured to detect the absolute position of the first unit base 46 and the detection result of the absolute value encoder 51 configured to detect the absolute position of the first unit barrel 45 are output to the lens CPU 23B. The lens CPU 23B calculates the object distance based upon the detection results of the absolute value encoders 50 and 51 and the matrix table illustrated in FIG. 3.

When one focus lens is driven by two drivers in the conventional structure, the two drivers drive the focus lens and the first driver drives the focus lens with the barrel configured to hold the second driver. However, in an attempt to detect the position of the focus lens inside the barrel from the outside, the barrel needs a notch and requires a large size and a complicated structure so as to maintain the rigidity.

This embodiment provides the absolute value encoder 51 to the first unit base 46, and the encoder 51 detects a moving amount of the first unit barrel 45 by the second stepping motor 19B relative to the first unit base 46. In other words, this embodiment does not provide the encoder 51 to the outside of the first unit base 46, and thus it is unnecessary to provide a notch to the first unit base 46. Therefore, this embodiment solves a problem of a large size of the first unit base 46 which is otherwise required to maintain the rigidity.

The major operation of the camera system of this embodiment is similar to FIG. 4. However, in this embodiment, in S1003, the lens CPU 23A calculates the object distance based upon the absolute value encoders 50 and 51 and the previously obtained relationship, and sends that information with the focal length information to the camera CPU 32. In addition, in S1006, the camera CPU 32 starts driving the first stepping motor 18B, and in S1008, the camera CPU stops driving the first stepping motor 18B. In S1009, the camera CPU 32 starts driving the second stepping motor 19B, and in S1011, the camera CPU 32 makes the second stepping motor 19B drive back to the sharpness peak position.

This embodiment can also precisely calculate the object distance based upon the detection results of the two detectors configured to detect two drivers and the previously obtained relationship.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, while both of the first and second embodiments use an encoder that includes a zone brush and a zone substrate so as to detect the focus lens position, the focus lens position may be detected by storing the driving pulses because the driving pulse of the stepping motor corresponds to the driving amount. In addition, as a function using the information of the object distance, information of control of strobe emission and a lens characteristic that values for each object distance may be presented to the camera side.

This application claims the benefit of Japanese Patent Application No. 2011-236922, filed Oct. 28, 2011, which is hereby incorporated by reference herein in its entirety.

What is claimed is:

1. An optical apparatus comprising:
a first driver configured to drive a focus lens unit in autofocusing;
a second driver configured to drive the focus lens unit in the autofocusing;
a first detector configured to detect a driving amount of the first driver;
a second detector configured to detect a driving amount of the second driver;
a memory configured to store a relationship between information of detection results of the first and second detectors, and an object distance as a distance from the optical apparatus to an object; and
a controller configured to obtain information of the object distance based upon the relationship stored in the memory and the detection results of the first and second detectors.

2. The optical apparatus according to claim 1, wherein the second driver drives the focus lens unit with a higher resolution than that of the first driver.

3. The optical apparatus according to claim 2, wherein the second driver drives the focus lens unit at a speed lower than that of the first driver.

4. The optical apparatus according to claim 1, wherein the information of the detection results of the first and second detectors are arranged in a matrix, and the object distance is arranged as a matrix element.

5. The optical apparatus according to claim 1, wherein the focus lens unit includes a first focus lens unit driven by the first driver, and a second focus lens unit driven by the second driver.

6. The optical apparatus according to claim 4, wherein the number of pieces of information of the detection result of the first detector is more than that of the second detector in the matrix.

7. The optical apparatus according to claim 1, wherein the second driver drives the focus lens unit, and the first driver drives a base configured to hold the focus lens unit and the second driver.

8. The optical apparatus according to claim 7, wherein the second detector is provided to the base, and configured to detect a driving amount of the second driver relative to the base.

9. The optical apparatus according to claim 1, wherein the controller is configured to obtain an image-pickup magnification based upon obtained information of the object distance and information of a focal length, and to select a focus detection range and a photometric range.

10. The optical apparatus according to claim 1, further comprising an image-pickup element configured to photoelectrically convert an object image of an object.

* * * * *